UNITED STATES PATENT OFFICE.

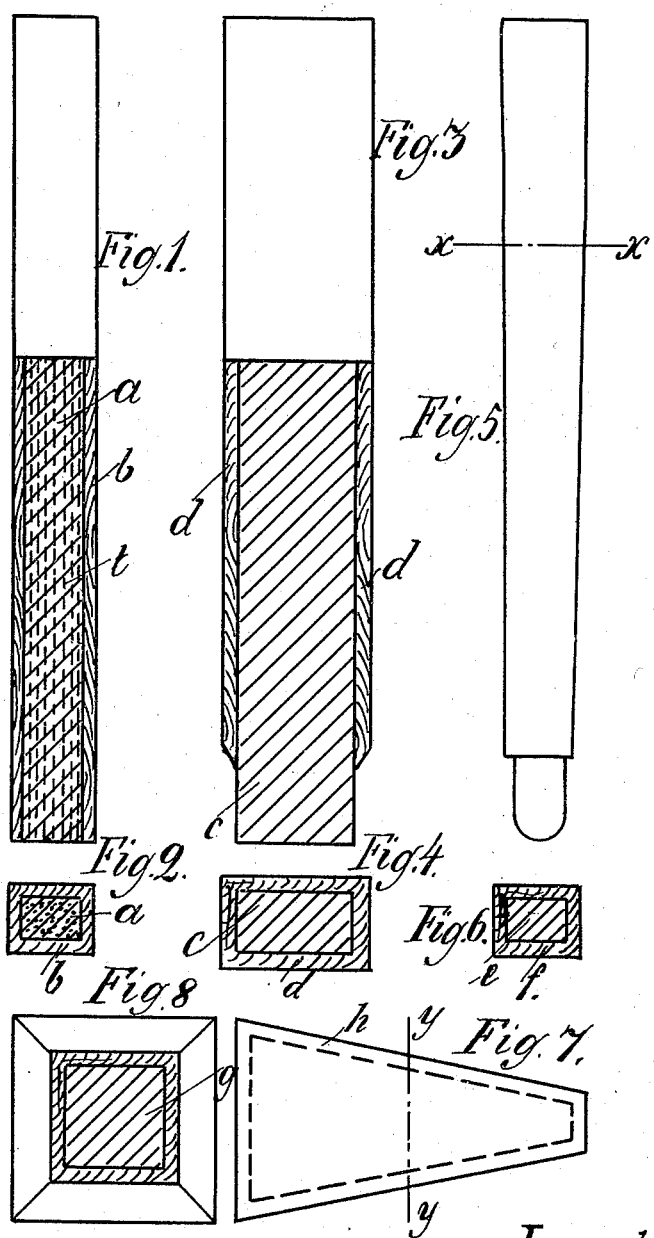

EUGÈNE FERDINAND FORSMAN, OF STOCKHOLM, SWEDEN.

TOOL FOR GUMMING.

SPECIFICATION forming part of Letters Patent No. 647,181, dated April 10, 1900.

Application filed August 25, 1899. Serial No. 728,461. (No model.)

*To all whom it may concern:*

Be it known that I, EUGÈNE FERDINAND FORSMAN, machine agent, of 28 Hornsgatan, Stockholm, in the Kingdom of Sweden, have invented an Improved Tool for Gumming, of which the following is a specification.

The present invention relates to a tool intended to be used for gumming or gluing paper, pasteboard, thin boards, or the like instead of the now commonly used method of applying dissolved gum with a brush.

The object of the invention is to do away with the drawbacks attached to the use of dissolved gum and a brush—such as, for instance, soiled fingers, &c.

Figure 1 is a side elevation, partly in section, of a gumming-tool embodying my invention. Fig. 2 is a cross-section of Fig. 1. Fig. 3 is a side elevation, partly in section, of another form of gumming-tool made according to my invention. Fig. 4 is a cross-section of Fig. 3. Fig. 5 is an elevation of another form of gumming-tool made according to my invention. Fig. 6 is a cross-section of Fig. 5, taken on line $x$ $x$. Fig. 7 is a side view of a further-modified form of gumming-tool. Fig. 8 is a section taken on line $y$ $y$ of Fig. 7.

Referring to Fig. 1, the tool consists of a rod $a$, of gum-arabic or other gummy or glutinous material, preferably surrounded by a protecting-cover $b$, of wood, metal, or pasteboard, or other suitable material. For the purpose of counteracting the effect caused by alterations of temperature on some gummy or glutinous materials threads $t$, of any suitable material, may be passed through the rod $a$ of the gum. The number of these threads depends on the size and shape of the body.

Figs. 3 and 4 show the body of gum in a flattened shape $c$, with the cover $d$ cut away at the end, so that the tool is ready for use.

Figs. 5 and 6 show the body of gum in a tapering form $e$, the cover $f$ not completely covering the gum.

Figs. 7 and 8 show the body of gum in a pyramidal form. In this case the gum $g$ is completely enveloped in its cover $h$.

When the tool is to be used and as the gum wears down, the cover is cut or torn away at the end. When about to be used, the gum body is moistened and then applied to the article in the same manner as a brush dipped into dissolved gum. The outer cover of these tools, besides protecting the gum, prevents the soiling of the hand.

I claim as my invention—

1. A gumming-tool consisting of a body of gummy or glutinous material shaped in a suitable manner, and threads passing through said body.

2. A gumming-tool consisting of gum-arabic or other gummy or glutinous material shaped in a suitable manner and supplied with a cover or case of suitable material, threads of suitable material being passed through the said body of gum-arabic or other gummy or glutinous material.

In testimony whereof I have signed my name to this specification in the presence of two subscribing witnesses.

EUGÈNE FERDINAND FORSMAN.

Witnesses:
J. NILSSON,
E. TEGNÉR.